INVENTOR
CHARLES W. HASTINGS
BY Bruce C Lutz
ATTORNEY

INVENTOR.
CHARLES W. HASTINGS
BY Bruce C Lutz
ATTORNEY 3,508,213

FERROELECTRIC MEMORY APPARATUS USING THE TRANSCHARGER PRINCIPLE OF OPERATION

Charles W. Hastings, Falcon Heights, Minn., assignor to Honeywell Inc., Minneapolis, Minn., a corporation of Delaware Filed June 14, 1967, Ser. No. 646,007
Int. Cl. G11c *11/22*
U.S. Cl. 340—173.2 9 Claims

ABSTRACT OF THE DISCLOSURE

This specification discloses a bulk memory which uses a sheet of ferroelectric material as the storage medium wherein the transcharger principle of operation is used to store and read information.

The invention described herein was made in the performance of work under a NASA contract and is subject to the provisions of Section 305 of the National Aeronautics and Space Act of 1958, Public Law 85–568(72 Stat. 435; 42 U.S.C. 2457).

CROSS REFERENCE TO RELATED APPLICATION

This invention is related to the invention disclosed in my copending application, Ser. No. 562,786, filed July 5, 1966, now Patent 3,435,425, and assigned to the same assignee as the present invention.

BRIEF DESCRIPTION OF THE INVENTION

In the above-referenced copending application a large scale memory using a ferroelectric storage medium is disclosed. This memory has, as one of its uses, the capability of being used as a peripheral memory. A related memory is disclosed in J.M.N. Hanlet 3,083,262. This invention relates to an improved ferroelectric memory wherein information is stored in and read from the memory using a transcharger or transpolarizer principle of operation.

The transcharger or transpolarizer is disclosed in an article by C. S. Pulvari, "The Transpolarizer: An Electrostatically Controlled Circuit Impedance With Stored Setting," Proceedings of the IRE, June 1959, pages 1117–1123. Ferroelectric materials have, as an inherent characteristic, a hysteresis effect. This hysteresis effect is analogous to the hysteresis of magnetic materials and can be used to store information. Also, since the ferroelectric material has this hysteresis effect, the effective small-signal capacitance of a ferroelectric capacitor changes as the operating point on the hysteresis curve changes. In contrast, the effective small-signal capacitance of an ordinary dielectric capacitor remains essentially constant over a wide range of applied voltages. By connecting two ferroelectric capacitors in series, this capacitance change effect can be used to store information in such a manner that the information can be read non-destructively. Ferrielectric materials exhibit the same hysteresis effect and can be substituted for the ferroelectric materials without significantly changing the principles of operation.

Two species of this invention are disclosed. The first species uses a sheet of ferroelectric material placed over parallel conductors. A layer of photoconductive material is placed over the ferroelectric material and a layer of transparent conductive material is placed over the photoconductive material. The conductors are arranged in pairs with each pair of conductors, together with the adjacent ferroelectric material, acting like a transcharger. When the photoconductor is not illuminated, it has a very high resistance so that it supports substantially all of the electric field between the conductors and the transparent conductor. The photoconductor is excited by electromagnetic radiation at selected points. When it is excited, the photoconductor has a very low resistance so that substantially all of the electric field between the conductors and the transparent conductor is supported across the ferroelectric material. The structure is operated in such a way that a U-shaped conducting path is established between a conductor, through the ferroelectric material, through an excited area of the photoconductor, through the transparent conductor, back through another excited area of the photoconductor, and back through the ferroelectric material to a second conductor, so that two ferroelectric capacitors are essentially placed in series.

When the ferroelectroc capacitors are polarized so that an electric field impressed across the pair tends to switch both of them, the drive current will be relatively large. However, when the polarization of the ferroelectric capacitors is such that one tends to switch and the other tends to be driven further into saturation, neither ferroelectric capacitor will switch and the drive current will be relatively small. One of these two conditions can be denoted as a "0" and the other can be denoted as a "1." By distinguishing between the amount of drive current, it can be determined whether a "1" or a "0" is stored. For example, the "unblocked" condition where both ferroelectric capacitors are polarized in such a direction that both tend to switch can be designated as a "1," and the "blocked" condition where neither will be switched must then be designated as a "0."

Once information has been read from the transcharger, the polarization of memory cells where "1" signals are stored will be partially reversed. However, the information can be restored simply by reversing the direction of the applied electric field. Since blocked cells will not be affected by the reverse drive current, and unblocked cells which have not been partially switched will merely be driven so as to maintain their present saturated condition, the entire memory can be restored to its original condition without individually preserving the information read from the various cells. This restore operation is similar to that of a "transfluxor" magnetic core memory; but it is in sharp contrast to that of an ordinary toroidal magnetic core memory, where the information is read from the memory, and then the same information is replaced in the location from which it was read by using that information to control the restoring driver circuits.

A second embodiment of this invention uses a structure somewhat more similar to that disclosed in the above-referenced copending application. In this embodiment, two coöperating photoconductors having dissimilar characteristics are placed between the transparent conduc- and the layer of ferroelectric material. Generally orthogonal beams of electromagnetic radiation are provided. One beam energizes the first one of the photoconductors but not the second one, and a second beam energizes the second photoconductor but not the first. Thus, the photoconductors are excited at only the points where the electromagnetic radiation beams cross. The conducting path for transcharger operation is from one transparent conductor, through both photoconductors at coincidentally excited areas, through the ferroelectric material, through the conductor beneath the ferrolectric material, back through the ferroelectric material, through both photoconductors at coincidentally excited areas, and to a sec ond transparent conductor. As was noted above, ferrielectric materials can be substituted for the ferroelectric materials.

Accordingly, it is an object of this invention to provide new and novel memory apparatus using a ferroelectric storage medium.

This and other objects and advantages of this invention will become evident to those skilled in the art upon a reading of this specification and the appended claims in conjunction with the drawings, of which:

FIGURES 1A, 1B, AND 2

Figures 1A, 1B:
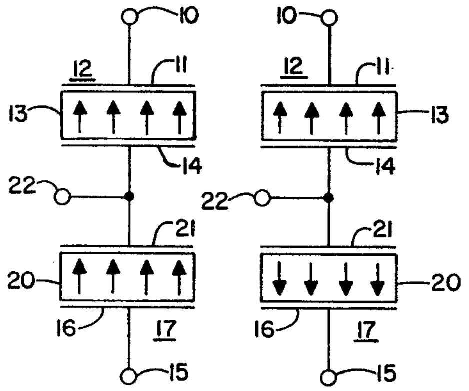
FIGURE 1A and FIGURE 1B illustrate transchargers storing "1" and "0" signals, respectively.

The same numerical references are used for FIGURES 1A and 1B since the structure shown in these two figures is identical. A first terminal 10 is connected to one plate 11 of a storage means or ferroelectric capacitor 12 having a ferroelectric dielectric means 13 and a second plate 14. A second terminal 15 is connected to a first plate 16 of a storage means or ferroelectric capacitor 17 which has a ferroelectric dielectric means 20 and a second plate 21. A third terminal 22 is connected to plate 14 of capacitor 12 and plate 21 of capacitor 17. The combination of capacitors 12 and 17 is called a transcharger or transpolarizer.

Information is stored in the transcharger by polarizing the dielectric of capacitors 12 and 17. The direction of polarization of dielectrics 13 and 20 is illustrated schematically by arrows. For example, in FIGURE 1A capacitor 12 is shown as having dielectric 13 polarized from plate 14 to plate 11. Capacitor 17 is shown as having dielectric 20 polarized from plate 16 to plate 21. In FIGURE 1B the polarization of capacitor 17 is reversed. Capacitor 12 is polarized by the application of signals between terminals 10 and 22 while capacitor 17 is polarized by the application of signals between terminals 15 and 22. The "unblocked" condition of capacitors 12 and 17, as shown in FIGURE 1A, is defined as a "1"; and the "blocked" condition of capacitors 12 and 17, as shown in FIGURE 1B, is defined as a "0."

Figure 2:
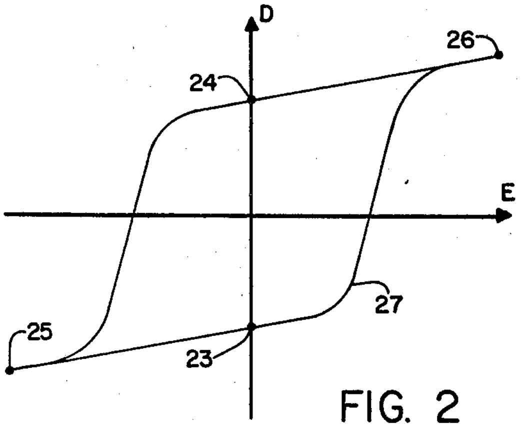
FIGURE 2 shows a hysteresis curve for ferroelectric materials.

FIGURE 2 shows a hysteresis curve with the axes labeled D and E. D is the electric dispalcement or total electric intensity resulting within the ferroelectric material and E is the externally applied electric field. The D-E hysteresis curve is directly analogous to the B-H hysteresis curve for magnetic materials. The slope of the hysteresis curve is $$\epsilon=\frac{dD}{dE} \quad (1)$$

where $\epsilon$ is the dielectric permeability, The small signal capacitance of a ferroelectric capacitor is directly proportional $\epsilon$ and is given by $$C=K\epsilon=K\frac{dD}{dE} \quad (2)$$

where K is a constant of proportionality.

The remanent or residual polarization points on the hysteresis curve for ferroelectric capacitors that are polarized are points 23 and 24. In other words, when a ferroelectric capacitor is driven into saturation, it will retain a net polarization in the absence of an applied electric field; this net polarization is represented by points 23 or 24 depending upon the direction of polarization. When the polarization of the ferroelectric capacitor is driven by an electric field from point 23 further into saturation or point 25, $dD/dE$ or the slope of the curve is small and consequently the capacitance is small. However, when the polarization is driven from point 23 (the negative remanent polarization point) toward positive saturation or point 26, $dD/dE$ starts changing quite rapidly as soon as the knee 27 of the curve is reached. When $dD/dE$ increases, the capacitance correspondingly increases.

In FIGURE 1A the polarization of dielectrics 13 and 20 is such that both dielectrics will reverse their direction of polarization when terminal 10 is made sufficiently positive with respect to terminal 15 and terminal 22 is open circuit. However, in FIGURE 1B the direction of polarization of ferroelectric capacitors 12 and 17 is opposite, and effect of this configuration is that the signal applied between terminals 10 and 15 will not reverse the direction of polarization of either dielectric 13 or dielectric 20, because the following consequences will ensue: If terminal 10 is made positive with respect to terminal 15, the direction of polarization of dielectric 13 will begin to reverse. That is, on the cure of FIGURE 2 the polarization of dielectric 13 will start to move from point 23 toward the knee 27 of the curve. However, dielectric 20 will be driven from point 24 toward saturation or point 26. Thus, the capacitance of ferroelectric capacitor 17 will be very small, while the capacitance of ferrolectric capacitor 12 will be small initially but will increase rapidly when the knee 27 is reached. Following the ordinary voltage division rule for serially connected capacitors, it is apparent that once the polarization of dielectric 13 starts to reverse, substantially all of the voltage will be dropped across capacitor 17. Since at this point only a small percentage of the voltage will be across capacitor 12, substantially no further flux reversal or switching of dielectric 13 will occur. Of course, if very large signals are applied across the serial combination of ferroelectric capacitors, flux reversal could occur, but such large signals would not ordinarily be applied.

The meaning of the terms "blocked" and "unblocked" is obvious from the preceding discussion. A transcharger in the condition illustrated in FIGURE 1B is "blocked" from polarization reversal or "switching," whereas the "unblocked" transcharger of FIGURE 1A can be switched.

FIGURES 3 AND 4

Figure 3:
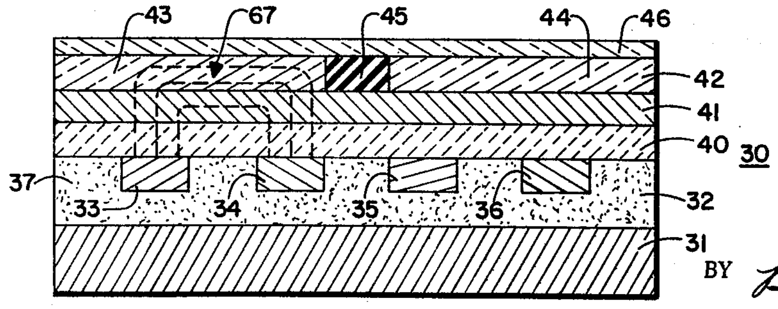
FIGURE 3 shows a cross-section of one embodiment this invention.
Figure 4:
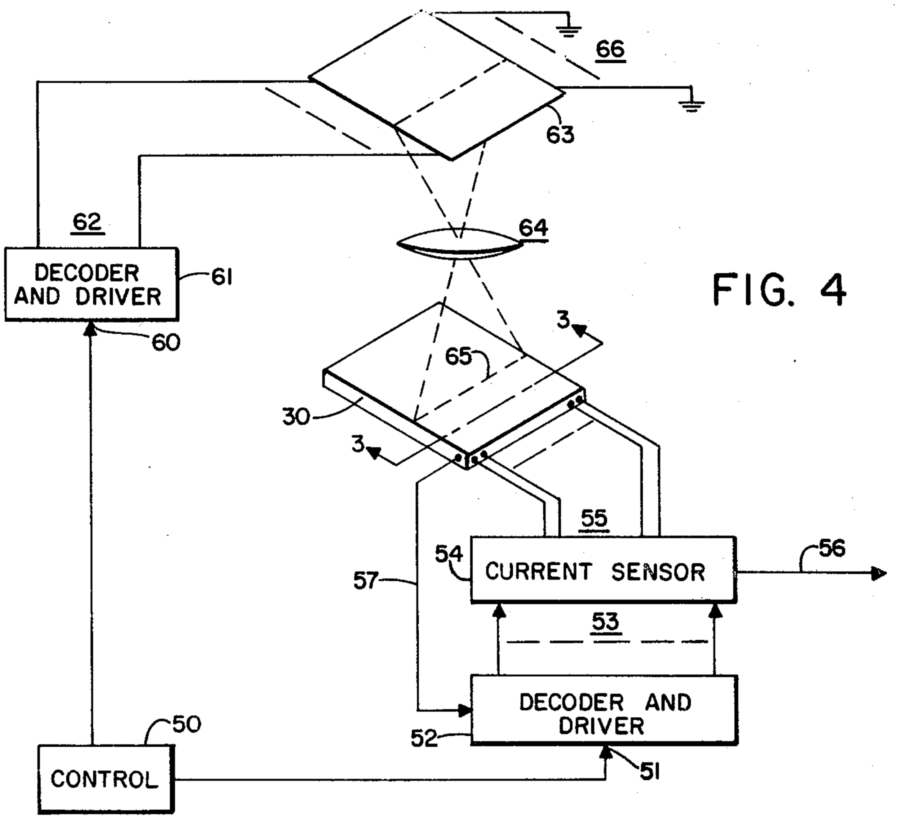
FIGURE 4 shows the structure of FIGURE 3 incorporated into a block diagram of a memory system.

FIGURES 3 and 4 show a memory system using a continuous layer of ferroelectric material as a storage medium or means. FIGURE 3 is a cross-section of memory plane 30 of FIGURE 4. In FIGURE 3, there is shown a substrate means or layer 31. A layer 32 is placed on substrate 31; layer 32 includes a plurality of metallic conductors 33, 34, 35, and 36. Conductors 33–36 are placed in a bonding compound 37 which may be any suitable insulating bonding compound to hold conductors 33–36 in a fixed relationship and to prevent electrical cross coupling between conductors 33–36. Next, a ferroelectric sheet, means, layer or medium 40 is placed on layer 32. Layer 40 is a storage means or medium of memory plane 30. A photoconductive layer or means 41 is placed on layer 40. A layer of transparent conductors 42 is placed on layer 41. Layer 42 includes a first transparent conductor 43 and a second transparent conductor 44, separated if necessary by an electrical insulator 45. A protective layer 46 may be placed on the transparent conductor layer 42; protective layer 46 could be glass or a transparent plastic. The structure of FIGURE 3 can be extended to any number of conductors desired.

Transparent conductors 43 and 44 can be a material such as stannic oxide ($SnO_2$), which is also known as tin dioxide, or indium oxide ($In_2O_3$). A very thin layer of metallic gold or platinum could alternatively be used. The photoconductive layer 41 can be any suitable photoconductor material such as cadmium telluride (CdTe) or cadmium sulfide (CdS). The ferroelectric layer 40 can be any suitable ferroelectric material such as barium titanate ($BaTiO_3$) or lead zirconate-lead titanate (sometimes called PZ–PT or PZT) material; a ferroelectric material such as bismuth titanate ($Bi_4Ti_3O_{12}$) or sodium vanadate niobate ($NaNbVO_3$) may be substituted without significantly changing the principles of operation. It should be noted that the dimensions in FIGURE 3 are not to scale; generally the vertical dimensions of the layers have been exaggerated for clarity.

FIGURE 4 shows a memory system including memory plane 30. A control means 50 has a first output connected to an input 51 of a decoder and driver 52. Control means 50 generates signals to select certain addresses or words in memory plane 30. Information is written into or read from the particular location, word, or block which was addressed. Decoder and driver 52 receives a coded signal at input 51 and decodes that signal. Decoder and driver 52 includes a set or array of drivers which are energized in accordance with the coded input signal. When a particular driver is energized, it transmits an output current over a particular output line or lines. Decoder and driver 52 has a set of output lines or conductors connected to inputs 53 of a current sensor or array or set of current sensors 54. Current sensors 54 can be an array of sense amplifiers which are used to discriminate between "1" and "0" signals during reading. Generally one sense amplifier would be used per bit so that words can be read from the memory in parallel. Current sensors 54 have a plurality of outputs 55 which are connected to conductors 33–36 of memory plane 30. It should be noted that conductors 33 and 34 correspond to one bit position of a word while conductors 35 and 36 correspond to a second bit position. Thus, the number of conductors in memory plane 30 and of external conductors 55 is dictated by the number of bits per word. Current sensor 54 also has an output 56 which may be a plurality of conductors. When information is read from memory 30, the output "1" and "0" indications appear at output 56. A conductor or plurality of conductors 57 from transparent conductors 43–44 to decoder and driver 52 provides a return path for currents during writing.

Control means 50 has a second output connected to an input 60 of a decoder and driver 61. Decoder and driver 61 has a set of output conductors 62 connected to inputs of an array of electromagnetic radiation or light sources 63. Decoder and driver 61 energizes particular ones of radiation sources 63 in accordance with coded signals generated by control means 50. A common conductor 66 provides a return path for the drive currents which energize source 63. As an alternative to the array of light or electromagnetic radiation sources 63 and the associated electronics, a single light or electromagnetic radiation beam may be scanned across memory plane 30 by a scanning means, which may for instance be electromechanical, electro-optic, magneto-optic, or piezoelectric.

In the above-referenced copending application various radiation sources were discussed. For example, gallium arsenide (GaAs) diodes could be used with a CdTe photoconductor 41. Silicon carbide (SiC) diodes could be used with a CdS photoconductor 41. Zinc sulfide (ZnS) electroluminescent strips could also be used with CdS photoconductor 41. CdS is also an electroluminescent material which could be used with CdS photoconductor. It will be appreciated by those skilled in the art that the particular radiation or light sources must generate light within a range of frequencies which will energize the particular photoconductor used. However, the light does not have to be in the visible range, so that the term "light" as used in the specification covers a broader range of frequencies than are considered to be "visible light."

The light generated by source 63 is spread in a beam which is focused by an optical means 64. Optical means 64 is shown as a single lens for simplicity. The light beam is focused along a beam or line 65 on memory 30. Thus, photoconductor 41 is energized along a line generally orthogonal to the conductors 33–36. The beam or line 65 is moved across the surface of memory 30 by energizing different ones of sources 63, or in the aforementioned alternative by actuating the scanning means. The line 65 corresponds to a word or block in memory 30 with each different line corresponding to a different word or block.

To write information into the memory, control 50 provides an address signal to decoder and driver 61 which specifies the memory word which is to be written into. Control 50 transmits the bit information to decoder and driver 52. Decoder and driver 61 energizes source 63 to provide a single beam of light 65 by energizing a particular one of sources 63, or by actuating a scanning means. Simultaneously, decoder and driver 52 provides signals or voltages on conductors 33–36.

Assume that when a "1" is stored the ferroelectric material between conductors 33 and 34 and conductor 43 is polarized from conductor 33 to conductor 43 and from conductor 43 to conductor 34. When a "0" is stored, the polarization of the ferroelectric material between conductors 43 and 34 is from conductor 34 to conductor 43. Thus, the polarization of the ferroelectric material between conductors 33 and 43 remains the same for "1" and "0."

Assume that the signal from control 50 indicates that a "1" is to be written into the bit of a memory word represented by conductors 33 and 34. The light source 63 corresponding to the particular word is energized to energize photoconductor 41 adjacent to or above the selected word. A voltage is impressed across conductors 43 and 34 such that conductor 34 is negative with respect to conductor 43. The electric field generated by this voltage will polarize ferroelectric 40 between conductors 34 and 43. Note that the ferroelectric material between conductors 33 and 43 always remains polarized from conductor 33 to conductor 43. A "0" is written in the same way except that conductor 34 is made positive with respect to conductor 43. One acceptable arrangement is that conductors 33 and 43 remain at ground potential while conductor 34 is made either positive or negative. Conductors 35, 36, and 44 are energized as described above to store a second bit of the selected word. Thus, words can be written in a "parallel" fashion, which is to say that all bits of a word can be written simultaneously, as long as control 50, decoder and driver 52, and current sensor 54 are appropriately organized for this mode of operation.

After the selected word has been written, control 50 provides another set of output signals which cause decoder and driver 61 to energize a different one of light sources 63 so that the beam of light 65 is stepped to the next successive word. Alternately, control 50 synchronizes itself with a scanning means which positions the beam of light at that word. Conductors 33–36 and 43–44 are again energized to write "1" or "0" in the particular bits of the next word. The distance between adjacent words is controlled by the distance necessary to prevent interference between bits or polarization areas of ferroelectric material 40. The distance between conductors 33–36 is the distance necessary to prevent coupling of signals between adjacent conductors. In other words, the electrical coupling must be between conductors 33–36 and conductors 43–44 and not between adjacent ones of conductors 33–36.

To read information from the memory, control 50 supplies the address of the word to be read to decoder and driver 61 to energize the appropriate light source. Conductors 43–44 are open-circuited and decoder and driver 52 drives conductors 33–36. Since the direction of polarization was defined above, conductor 34 must be made positive with respect to conductor 33 to read. Preferably conductor 33 is held at ground potential while conductor 34 is made positive. A conducting path will be established from conductor 34 to conductor 43 and from conductor 43 to conductor 33. Since conductors 34 and 43 form one ferroelectric capacitor and conductors 33 and 43 form a second ferroelectric capacitor, two ferroelectric capacitors will be placed in series to comprise a transcharger as in FIGURE 1. If a "1" is stored, the transcharger is unblocked and the polarization of the ferroelectric material will switch; if a "0" is stored, the transcharger is blocked and the polarization of the ferroelectric material will not switch. Thus, a large drive current will signify that a "1" is stored, whereas a small drive current will signify that a "0" is stored. The magnitude of the drive current is sensed by current sensor 54 to discriminate between "1" and "0." The operation of conductors 35 and 36 is substantially the same as the operation of conductors 33 and 34. It is evident that all of the bits of an addressed word are read in parallel or simultaneously.

After one word is read, control 50 provides the address of the next word to be read. Decoder and driver 61 decodes the address and energizes the appropriate element of source 63 to read the next word.

Electrical insulator 45 becomes important during reading. If conductors 43 and 44 were shorted together, there would be electrical coupling between bits which would provide erroneous operation. Since photoconductor 41 becomes conductive when illuminated, it would short conductors 43 and 44. Thus, insulator 45 is preferably opaque so that the photoconductor beneath it is not energized.

After information has been read from the memory, the polarization of each bit where a "1" signal was stored is partially reversed. It is necessary to restore these bits to their original condition before they can be read again. During the restore operation, the elements of light source 63 are sequentially energized so that all words which were read are sequentially addressed; alternatively the entire plane can be illuminated simultaneously by the use of some other light source or sources. The drivers in decoder and driver 52 are simultaneously energized so that conductor 34 is negative with respect to conductor 33. Similarly, conductor 36 would be made negative with respect to conductor 35. In this manner the partial polarization reversal for each bit from which a "1" was read will be canceled, leaving the bit in its original unblocked state. However, no other bits will be affected; each unblocked bit (containing a "1") which was not recently read will not be affected since the applied voltage will merely tend to resaturate it in its present state, and each blocked bit (containing a "0") will not be affected since the blocking effect is symmetrical with respect to the applied voltage. Thus, the information from each word does not have to be retained to restore the memory.

FIGURES 5 AND 6

Figure 6:
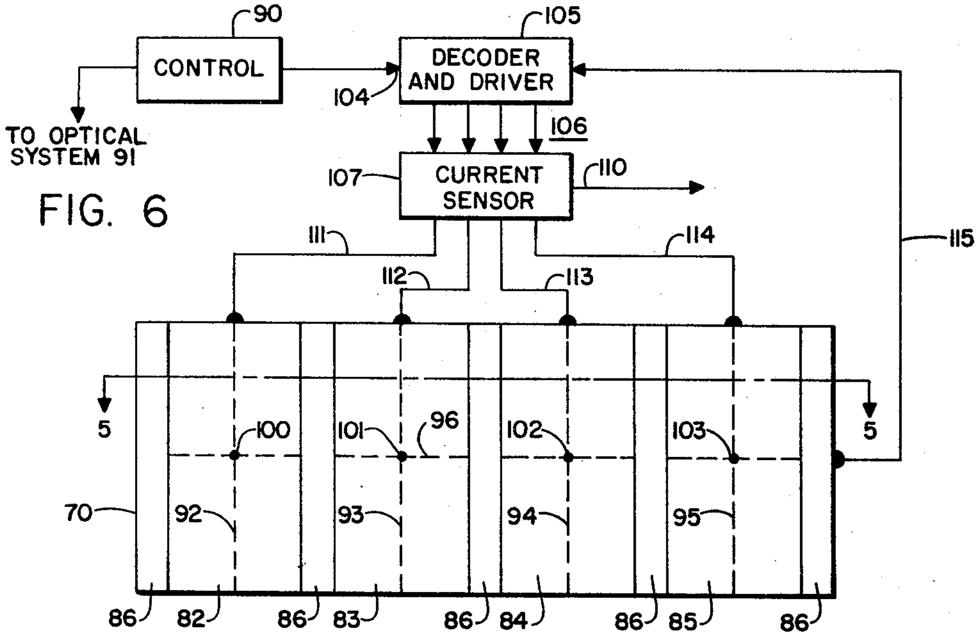
FIGURE 6 shows the structure of FIGURE 5 incorporated into a block diagram of a memory system.
Figure 5:
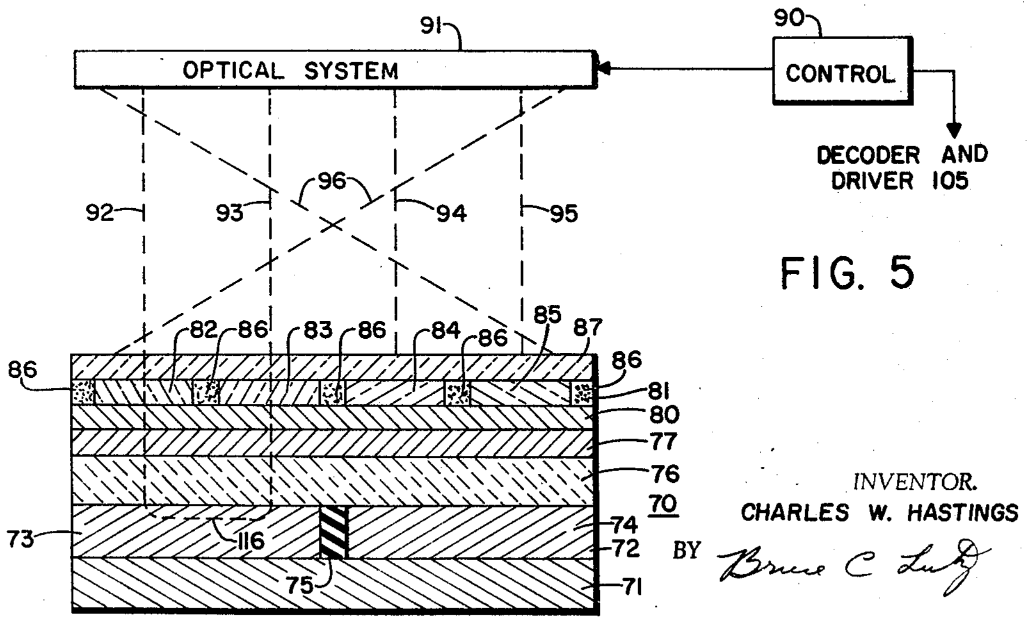
FIGURE 5 shows a cross-section of a second embodiment of this invention.

FIGURES 5 and 6 show a second embodiment of this invention which is more closely related to the invention disclosed in my above cross-referenced application. FIGURE 5 is a cross section of memory plane 70 of FIGURE 6 taken along line 5—5. In FIGURE 5 there is shown an electrically insulating substrate 71. Layer 72 includes a first conductor 73 and a second conductor 74 separated by an electrical insulator 75. A ferroelectric memory medium, layer, means, or plane 76 is placed on conductor layer 72. A first photoconductive layer 77 is placed on ferroelectric layer 76, and a second photoconductive layer 80 is placed on the first photoconductor layer 77. A transparent conductor layer 81 is placed on photoconductor layer 80. Layer 81 includes a first transparent conductor 82, a second transparent conductor 83, a third transparent conductor 84, and a fourth transparent conductor 85 separated by electrical insulators 86. A transparent protective layer 87 may be placed over transparent conductive layer 81.

FIGURE 6 shows a top view of the memory plane in which transparent conductors 82–85 and insulators 86 appear at the surface.

Referring back to FIGURE 5, there is shown a control means or energization means 90, which has an output connected to an input of an optical system 91. Optical system 91 generates first beams of electromagnetic radiation 92–95 which strike transparent conductors 82–85, respectively, in a longitudinal direction. These radiation beams are represented by dashed lines 92–95 in FIGURES 5 and 6. Optical system 91 provides a transverse radiation beam represented by dashed line 96 which crosses each of radiation beams 92–95. The intersections of radiation beam 96 with radiation beams 92–95 are represented by dots 100–103, respectively.

In FIGURE 6 control 90, which is the same as control 90 of FIGURE 5, has an output which is connected to an input 104 of a decoder and driver 105 which has a plurality of outputs 106. Outputs 106 are connected to a current sensor 107. Current sensor 107 has an output 110 which is equivalent to output 56 of current sensor 54 of FIGURE 4. Current sensor 107 has a plurality of outputs 111–114 which are connected to transparent conductors 82–85, respectively. A lead or plurality of leads 115 connects the conductors in layer 72 back to decoder and driver 105 to provide a return path for current during writing.

In the above cross-referenced application an optical system suitable for use as optical system 91 is illustrated and described. Particular types of photoconductors, transparent conductors, and ferroelectric materials are mentioned above and are also mentioned in the above cross-referenced application. The requirements for photoconductive layers 77 and 80 are that radiation beams 92–95 must energize one of the photoconductors, for example, photoconductive layer 80, but must not sinificantly energize photoconductive layer 77. Radiation beam 96 must in this case energize photoconductive layer 77 but must not significantly energize photoconductive layer 80. It is evident that photoconductive layer 80 must be transparent to radiation which will energize photoconductive layer 77. Thus, where the radiation of the various beams cross, that is, points 100–103, the photoconductors will be coincidentally energized so that a conducting path will be established between the various transparent conductors. For example, a conducting path will be established between transparent conductor 82 and transparent conductor 83 which will be through the photoconductor layers 77 and 80 beneath points 100 and 101. The electric field between photoconductors 82 and 83 will be through the ferroelectric material beneath points 100 and 101 and through conductor 73 as shown by dotted line 116 in FIGURE 5.

It may be noted that the spectral response and transmissivity characteristics of intrinsic CdS and intrinsic CdTe are such that intrinsic CdS could be considered for use in photoconductive layer 80 and intrinsic CdTe for use in photoconductive layer 77. The wavelength of light beams 92–95 would then be in the range 4000–5500 Angstrom units and the wavelength of "light" (although not visible) beam 96 would then be in the range 8000–11000 Angstrom units (about 9000 Angstrom units would be preferred).

The operation of the structure indicated in FIGURES 5 and 6 is similar to the operation of the structure indicated in FIGURES 3 and 4. The main difference is that the roles of the transparent conductors and the metallic conductors are reversed. Electrical insulators 86 should be opaque to prevent radiation beam 96 from energizing the portion of photoconductive layers 77 and 80 beneath the insulator, because otherwise these photoconductive layers could short out conducting path 116 and prevent correct transcharger operation from taking place. Similarly, electrical insulator 75 may be placed between conductors 73 and 74 to prevent cross-coupling between conductors 73 and 74. As is described in the above cross-referenced copending application, radiation beam 96 can be stepped through its various positions and the plurality of beams 92–95 can be stepped through various positions. Thus, points 100–103 can be moved both horizontally and vertically on the surface of memory plane 70 to select the various words. In the preferred mode of organizing memory 70, each word has one bit associated with each of the transparent conductor pairs so that words can be read in parallel.

The above-referenced application also indicates various servoing systems which can be used with this invention to align memory plane 30 or memory plane 70 with the various radiation beams.

While I have illustrated and described various embodiments of my invention, those skilled in the art will realize that many modifications can be made within the scope of my invention. Accordingly, I wish to be limited solely by the scope of the appended claims.

I claim as my invention:

1. Information storage apparatus comprising, in combination:

a storage medium comprised of a layer of electrically polarizable material;

first conductor means disposed on a first side of said storage medium;

electromagnetic radiation responsive second conductor means disposed on a second side of said storage medium; at least one of said first and second conductor means being comprised of a plurality of conductors, means for providing electromagnetic radiation posiductor means being comprised of a plurality of conductor means for providing electromagnetic radiation of frequencies suitable for energizing said second conductor means; and control means, connected to said first and second conductor means and to said means for providing electromagnetic radiation, for operating said first and second conductor means, said storage medium, and said means for providing electromagnetic radiation in a first mode to selectively energize said first and second conductor means and said means for providing electromagnetic radiation to polarize selected areas of said storage medium, in a second mode to selectively energize conductors in one of said first and second conductor means in pairs to impress electric field in series across pairs of said selected areas of said storage medium for developing output signals indicative of the relative direction of polarization of said pairs of said selected areas from the amount of current necessary to maintain said electric fields, and in a third mode to apply electric fields across said pairs of said selected areas of said storage medium in a direction opposite to the electric fields impressed across said pairs of said selected areas of said storage medium during said second mode of operation.

2. Information storage apparatus as defined in claim 1 wherein said storage medium is a sheet of ferroelectric material, said first conductor means is comprised of a plurality of conductors, and said second conductor means is comprised of transparent conductor means and photoconductor means interposed between said second conductor means and said storage medium.

3. Information storage apparatus as defined in claim 2 wherein said first conductor means includes a plurality of first conductors and second conductors arranged in pairs, said photoconductor means is comprized of a single layer of photoconductive material, and said means for providing electromagnetic radiation provides radiation to energize said photoconductor means at locations adjacent to said selected areas of said storage medium whereby a conducting path is established through said photoconductor means at each of said locations.

4. Information storage apparatus as defined in claim 2 wherein said second conductor means is a plurality of transparent conductive strips electrically isolated from each other, said photconductor means is a first photconductor material responsive to electromagnetic radiation of a first range of frequencies and a second photoconductor material responsive to electromagnetic radiation of a second range of frequencies, said first and second photoconductors being disposed in successive layers on said storage medium, said means for providing electromagnetic radiation provides electromagnetic radiation of frequencies in said first and second ranges to coincidentally energize said first and second photoconductor materials at selected points whereby a conducting path is established through said photoconductor means at each of said points.

5. Information storage apparatus comprising, in combination:

a layer of ferroelectric material;

first conductor means juxtaposed with a first side of said ferroelectric material;

photoconductive means juxtaposed with a second side of said ferroelectric material;

transparent second conductor means juxtaposed with said photoconductive means;

radiation generating means for generating electromagnetic radiation of frequencies operable to energize said photoconductive means positioned so that said electromagnetic radiation penetrates into said photoconductive means;

energization means connected to said first and second conductor means and to said radiation generating means for energizing said first and second conductor means to establish electric fields between said first and second conductor means at points where said photoconductive means is energized by radiation; and control means connected to said energization means for operating said energization means and said radiation generating means in a write mode of operation to selectively energize said radiation generating means and said first and second conductor means to selectively impress electric fields across said ferroelectric material in one of two directions thereby polarizing selected areas of said ferroelectric material, in a read mode of operation to selectively energize one of said first and second conductor means and said photoconductive means to impress tric fields across each of said pairs are in series to said ferroelectric material in pairs so that said electric fiields across each of aid pairs are in series to provide a first output signal when each area of one of said pairs is polarized in the same direction and a second output signal when each area of one of said pairs is polarized in opposite directions, and in a restore mode of operation to impress electric fields in series across each of said pairs in the opposite direction to the electric fields impresed during said read mode of operation.

6. Information storage apparatus as defined in claim 5 wherein said first conductor means is comprised of a plurality of generally parallel conductors, said photoconductive means is a sheet of photoconductor material, and said radiation generating means provides a beam of radiation which strikes said photoconductor in a direction generally orthogonal to the direction of said plurality of conductors.

7. Information storage apparatus as defined in claim 5 wherein said transparent second conductor means includes a plurality of transparent conductors, said photoconductive means includes a first photoconductor layer responsive to electromagnetic radiation of frequencies in a first range and a second photoconductor layer responsive to electromagnetic radiation of frequencies in a second range, and said radiation generating means generates a plurality of first beams of radiation of frequencies in said first range which strike one on each of said transparent conductors and a second beam of radiation of frequencies in said second range at least a portion of which crosses each of said first beams so that said first and second sheets of photoconductor are coincidentally excited at locations where said second beam crosses said first beam.

8. The method of retrieving information from a ferroelectric memory wherein the storage medium is a continuous layer of ferroelectric material selectively polarized with parallel conductors juxtaposed with one side of said ferroelectric material and optically selectable conductors juxtaposed with the other side of said ferroelectric material comprising the steps of:

(1) optically selecting a strip of the optically selectable conductors, the strip being generally orthogonal to the parallel conductors;

(2) energizing the parallel conductors in pairs by applying a potential difference across the pair whereby a conducting path is established between the parallel conductors of said pairs, said conducting path being through the optically selected strip of the optically selectable conductor and said ferroelectric material between the selected conductors being energized in series;

(3) sensing the magnitude of the currents which result from making the first conductors of each pair positive with respect to the second conductors of the pair; and (4) reversing the polarity of energization of the conductors of each pair.

9. A method of retrieving information stored in an array of areas of a layer of ferroelectric material having photoconductive means responsive to electromagnetic radiations juxtaposed with one side of said ferroelectric material, a plurality of transparent first conductor means juxtaposed with said photoconductive means, and a plurality of second conductor means juxtaposed with the other side of said ferroelectric material comprising the steps of:

selecting strips of said photoconductive means with electromagnetic radiation;

energizing individual conductors of one of said first and second conductors means in pairs by applying a potential difference between the two conductors in each pair to establish a conducting path between the two conductors in each pair which is through at least two of said areas and through portions of said photoconductive means adjacent to said at least two of said areas; and sensing the magnitudes of the currents required to maintain the potential difference between the two conductors in each pair.

References Cited

UNITED STATES PATENTS

| | | | |
|---|---|---|---|
| 3,197,744 | 7/1965 | Lechner | 340—173.2 |
| 3,457,455 | 7/1969 | Samusenko | 340—173.2 X |
| 3,148,354 | 9/1964 | Schaffert | 340—173.2 X |
| 3,407,393 | 10/1968 | Haas | 340—173.2 X |
| 3,435,425 | 3/1969 | Hastings | 340—173 |

TERRELL W. FEARS, Primary Examiner

H. L. BERNSTEIN, Assistant Examiner

U.S. Cl. X.R.

250—220